Jan. 24, 1950  A. BRAMLEY ET AL  2,495,203
METHOD AND APPARATUS FOR REMOVING
BURNS FROM CATHODE-RAY TUBES
Filed March 8, 1946

INVENTORS
ARTHUR BRAMLEY
CARL E. SWANSON
BY
*J. F. Clerk*
ATTORNEY

Patented Jan. 24, 1950

2,495,203

UNITED STATES PATENT OFFICE 2,495,203

METHOD AND APPARATUS FOR REMOVING BURNS FROM CATHODE-RAY TUBES

Arthur Bramley, Long Branch, and Carl E. Swanson, North Arlington, N. J., assignors, by mesne assignments, to Philco Corporation, Philadelphia, Pa., a corporation of Pennsylvania Application March 8, 1946, Serial No. 652,922

9 Claims. (Cl. 316—12)

This invention relates to a method and means for extending the useful life of a cathode ray tube by removing burns, which may be produced by ion or electron bombardment, on the luminescent phosphor and/or the glass of the face plate of the tube.

The principal object of the invention is to provide a simplified method and apparatus for substantially restoring the initial light output of used cathode ray tubes, which loss was occasioned by burns formed on the screen structure comprising the glass of the face plate and the phosphor settled or deposited thereon.

Another object is the provision of a rejuvenation treatment for the screen structure of used cathode ray tubes, either of the projection television or direct view type, which treatment will remove ion or raster burns, respectively; also a treatment which may be applied to tubes having a face plate of hard or soft glass.

Another object of the invention is the provision of a heat treatment for the removal of burns to the extent of substantially restoring the initial light output of a cathode ray tube without changing the operating characteristics of the tube.

A further object is the provision of apparatus embodying a heat source rich in infra-red rays which may easily be applied to the treatment of the screen structure of a cathode ray television tube of the projection type without disturbing the focal position of the tube in a reflection-type optical system.

Other objects of the invention are made evident below.

While the invention has general application to cathode ray tubes, it is of special importance in connection with high voltage, cathode ray tubes designed for television purposes. Such tubes are of two general types, one being especially adapted for use as a projection tube and the other as a direct view tube; the luminescence of the screen is produced by electron bombardment. However, both types of tubes are operated at relatively high voltages which usually produce characteristic burns on the screen structure; such characteristic burns may be either a raster burn formed by the electrons striking the screen structure, or an ion burn produced by ions hitting the screen. However, ion burns are seldom produced in projection tubes.

A further differentiation is made in the construction of television cathode ray tubes by the kind of glass used in the fabrication of the envelope, particularly the face plate. The use of different glasses, i. e., soft glass such as lead or hard glass such as Pyrex, is dictated by the operating voltage, which is a determining factor of light output of the tube. Generally, the higher the operating power input of the tube, the more severe the burning of the luminescent screen, and the burning may reach a stage which causes a partial chemical decomposition of the screen, the latter materially impairing the light output of the tube.

In the case of burning by electron bombardment, part of the electron beam often penetrates the phosphor and irradiates the glass of the face plate. After prolonged exposure, the glass becomes discolored. This discoloration may be removed by a heat treatment capable of annealing the glass. This indicates that the electrons do not actually destroy the screen structure, but merely cause a discoloration thereof. We have found that the discoloration of both the phosphor and the glass face plate may be substantially removed by thermal irradiation produced by a heat source consisting principally of infra-red rays, which irradiation produces a chemical redistribution of the screen materials and consequent eradication of the discoloration.

Stated broadly, the method contemplated by the present invention consists in causing the luminescent phosphor screen, including the glass face plate, to be heated to a temperature sufficiently high to eliminate the aforementioned burn. The range of the temperature and period of application thereof will be determined by the type, and/or construction, of tubes undergoing treatment. Generally speaking, the temperature employed should be sufficiently high so that the vapor pressure of the deterioration products of the components comprising the phosphor or luminescent material be appreciable, and not higher than the softening point of the glass composing the face plate. The time period roughly depends upon the temperature, i. e., the higher the temperature the shorter the time, and vice versa, the lower the temperature the longer the period. Preferably, the heat treatment should be carried out in the absence of electrical excitation of the electrodes. These operations will be described more fully hereinafter.

Apparatus suitable for practicing the invention may comprise a source of infra-red rays capable of being directed on the surface of the luminescent screen structure. Many cathode ray television tubes are used in projection systems having reflective optical elements, as shown for example in United States Patent No. 2,295,779, issued September 15, 1942, and, in accordance with one feature of our invention, tubes so used may readily be treated in situ.

Referring to the accompanying drawings.

For the purpose of illustrating our invention, it will be described with special reference to cathode ray television tubes, more particularly to such tubes having white screens; however, it will be understood the invention is applicable to cathode ray tubes generally.

Presently there are two general types of white television screens, both types containing two phosphor components, one luminescing blue and the other yellow, blended to produce a desired shade or tone of white color. These screens have been designated or identified by RMA (Radio Manufacturers Association) as phosphor P4 and phosphor P6. The composition of these phosphors will be given hereinafter, but it may be noted in passing that the components of the phosphors are largely responsible for the loss in light output suffered by the tube during uninterrupted operation.

In high voltage television tubes the electron bombardment, which produces the luminescence of the screen, frequently penetrates the phosphor and irradiates the glass of the face plate, causing discoloration of both the phosphor and the glass. We have discovered that this discoloration may be removed by a suitable heat treatment. This discovery has led us to believe that the electrons merely become displaced to some metastable level which may be manifested as a discoloration. This theory will be further developed as the description proceeds.

Figure 1:
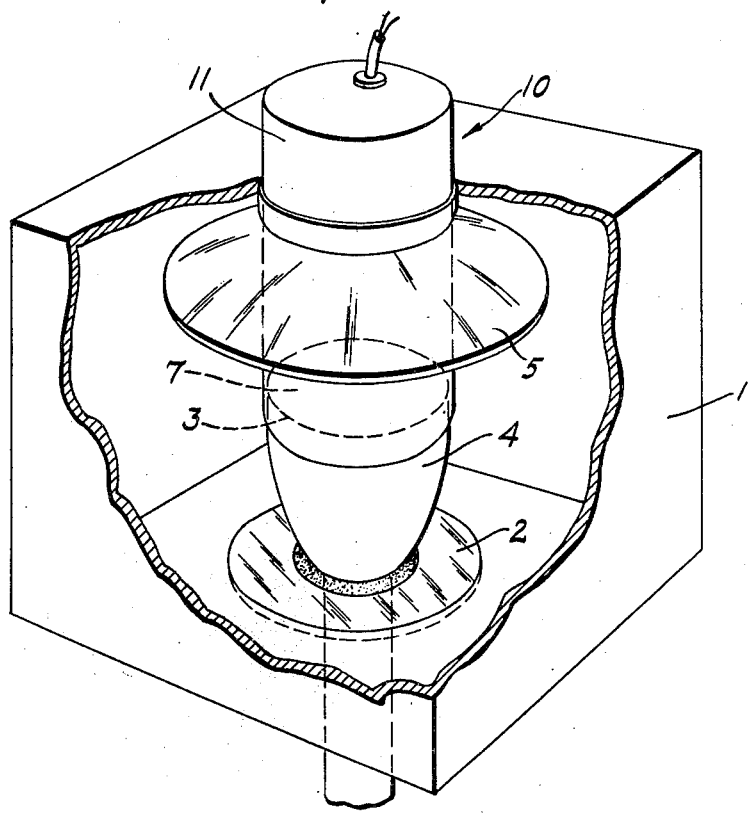
Fig. 1 is an isometric view, partly in section, showing the arrangement of a projection type television system, embodying the heating means contemplated by the present invention.
Figure 2:
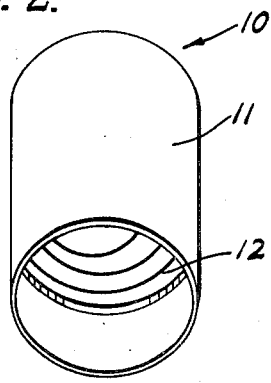
Fig. 2 is an isometric end view of the heating device, illustrating in particular the arrangement of the heater element.
Figure 3:
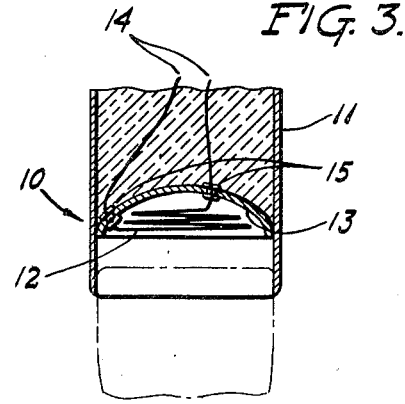
Fig. 3 a longitudinal sectional view showing the heater construction in detail.

Referring to the drawings we have shown only enough apparatus as may be necessary to a complete understanding of the invention. We have chosen to illustrate the invention as applied to the rejuvenation of a cathode ray television tube used in a projection system having reflective optical elements as disclosed in the aforesaid United States Patent No. 2,295,779. The essential elements of the projection system may be arranged in a housing 1, generally square or rectangular in form. Such systems are customarily provided with a concave mirror 5 having an aperture centrally disposed therein and comparable in size with the face plate 3 of a projection tube 4 held in a vertical position. The luminescent screen 7 is formed on the face plate 3. An electrically and thermally insulated heater, referred to generally by the reference character 10, is placed over the face plate 3 and in close proximity thereto (see Fig. 3). The heater 10 is snugly fittted about the end of the tube 4, in close proximity to the face plate 3, and held there while heat is applied from an electric source for the required period as hereinafter more fully explained. Included in the optical system is an aspherical correcting lens or plate 2 provided with an aperture adapted to accommodate the constricted neck portion of the tube 4.

The heater element 10 comprises preferably a polished metal tube 11 which closely fits the aperture of the mirror 5, or is temporarily sealed thereto by a resilient washer, as the presence of dust in the optical system will reduce its subsequent optical efficiency. The heating element of the heater 10 may comprise a spirally wound coil 12, transversely disposed within the tube 11, and augmented or backed up by a reflector 13 suitable for reflecting the infra-red radiation emitted by the coil 12. The ends of the coil 12 are provided with lead-in wires 14 which pass through perforated insulated terminals 15. A satisfactory heater such as generally described may be purchased under the trade name Ceno #16542, having a rating of 500 watts, and when operated at its regulated voltage and current may be adjusted to obtain effective temperatures within the range desired in practicing our method of removing burns.

Projection tubes used in television apparatus generally have a face plate of hard glass, such as Pyrex, but the tendency is to use tubes of soft glass, such as lead, because the latter is very much cheaper. When the face plate is of hard glass the temperature required to remove the burn is higher than that necessary to eliminate the burn of a soft glass tube, and there is a substantial difference in the time element. Broadly stated the higher the temperature the shorter the time element, and vice versa, the lower the temperature the longer the time. In many respects the heat treating schedule is largely empirical and must be determined from the nature of the glass of the face plate and the character of the phosphor. However, the range of temperature and time factor are not very critical and we have found that in treating a projection tube having a hard glass face plate and a fluorescent screen of either the P4 or P6 type, a temperature of the order of 500° centigrade applied for a period of about one hour has proved efficacious. If the face plate is made of soft glass, temperature of about 425° centigrade applied for a period of approximately two hours has been found to be satisfactory.

As mentioned above, cathode ray tubes used in television systems are commonly provided with a luminescent screen designated as P4 and P6. The phosphor of a P4 screen consists of two components; manganese activated zinc beryllium silicate and zinc sulphide silver activated, the fluorescent color is white. In the P6 screen the phosphor components are zinc sulphide silver activated and zinc cadmium sulphide which produce a white fluorescent color. Since these luminescent materials are well known in the art, and also the method of depositing them on a cathode ray tube face plate, no further data is needed respecting their composition and formation. However, it may be noted where the screen has been imperfectly deposited on the face plate of the tube, or where the thickness of the screen is thin, the electrons will penetrate the screen and irradiate the glass of the face plate. This discoloration of the glass is manifested as different shades of black. The blackening may be removed by heat treatment with an infra-red ray source which anneals the glass. The same heat source will also rejuvenate the screen so that the discoloration of the screen may be removed simultaneously with the discoloration of the glass.

In carrying out our method the heater 10 is fitted over the face plate 3 and the voltage and current regulated to produce the desired effective temperature for a given tube undergoing treatment. The temperature of the face plate may be measured by any suitable means such as a thermocouple or the like. Assuming that the tube being heat treated has a P6 luminescent screen and a face plate of hard glass, a temperature of about 500° centigrade should be applied for about one hour. At 488° centigrade the vapor pressure of zinc is 1 mm. Heating the phosphor to approximately that temperature evaporates the free zinc from the screen onto the cool side walls of the tube where it is not objectionable, i. e., does not interfere with the projection qualities of the tube. The free zinc was liberated by the previous decomposition of the zinc sulphide on exposure of the screen to electron bombardment. This decomposition product thus formed consists of a film of monomolecular layers which produce a distinct brown coloration causing a substantial reduction in the light output of the tube.

In the case of a hard glass tube having a P4 luminescent screen, the silicate component of the phosphor on heating to a temperature of about 500° centigrade, part or all of the bound oxygen may be released from the surface bond with manganese and the phosphor regains its original whiteness. Translucent manganese oxide (MnO) is taken back into the crystal lattice. The free $Mn_2O_3$ lodged on the crystal surface is responsible for part of the brown coloration.

In case the face plate of the tube is of soft glass, the temperature should not substantially exceed about 425° centigrade and the period of treatment should be for about two hours. By extending the period of treatment at this temperature the same results may be obtained as using a higher temperature for a shorter period, and the danger of exceeding the softening point of the glass is thus avoided.

While the method and apparatus have been disclosed so that they may effectively be utilized, a theory of operation will be set forth to aid in the fuller understanding of the invention. This theory accords with our experience in this matter, and it is not inconsistent with experiments devised to test it; however, it has not been conclusively proved, and in any case, the validity of the theory is not necessary to the effective use of the invention. This theory (formulated upon the above-described examples) is that during the normal operation of the tube, the luminescent material of a P6 screen is broken down into part of its chemical components, at least one of said components being a metal, such as zinc. Electrolysis of the material supporting the phosphor at the interface thereof may also occur, depositing a metallic film. Such films are thin, but not wholly transparent, and when an amount which is invisible to the naked eye has been deposited, the light is impeded and the image obscured. The application of localized heat to the metal film while retaining the rest of the tube cool, results in a vacuum distillation or sublimation of the material of the film, from the screen, to some other part of the tube. It is consistent with this theory that the degree of vacuum in the tube is unaffected by this process. Various degrees of heating were found to be effective, and those which caused that outer face of the envelope, on the adjacent inner face of which the phosphor was deposited, to be heated to in the region of from about 425° to 500° centigrade, depending upon the kind of glass composing the face plate, were found to be satisfactory.

In the case of a tube having a P4 screen, the activator of the silicate may be changed into a chemical composition to form an opaque material such as a higher oxide of manganese. (This is an additional feature to those mentioned above with respect to the treatment of a P6 screen.) The application of localized heat on the face plate (the temperature depending upon the kind of glass thereof) may result in the reduction of the opaque higher oxides of manganese into a translucent oxide form.

From the foregoing description it will be appreciated that in the application of our method to the removal of burns formed on a cathode ray tube we regard the screen structure as consisting of (1) a luminescent material deposited upon (2) a glass face plate. Either of these elements may be deleteriously affected by electrode bombardment, causing a discoloration of either the luminescent material and/or the irradiation of the glass. Applying a source of infra-red radiation to these parts removes the burn from the phosphor and also simultaneously anneals the glass, so that the burn is undetectable after treatment.

The rejuvenation of the tube is carried on in the absence of electrical excitation of the electrodes and the heating does not affect the vacuum of the tube. That is to say, the removal of the burn does not change the operating characteristics of the tube. At the same time the light output of the tube is restored substantially to the original efficiency of the tube and by repeating the method from time to time the useful life of the tube may be greatly prolonged.

It is to be noted that this invention is not intended to renew a tube the cathode or other electrodes of which have become impaired in effectiveness. It will be understood that the invention is susceptible of such changes and modifications as may come within the scope of the appended claims.

We claim:

1. The method of removing the burn from the luminescent screen of a used cathode ray tube, which comprises heating the screen to a temperature of from about 425° centigrade to about 500° centigrade and for a time period sufficient to remove said burn.

2. The method of removing the burn from the luminescent screen of a used cathode ray tube, which comprises heating the screen to an elevated temperature in the region of 500° centigrade, the heat being applied for a period in the neighborhood of one hour.

3. The method of removing burns from the screen structure of a used cathode ray tube, said screen structure consisting of a soft glass face plate and a luminescent material formed thereon, said material having a zinc compound as one of its components; which method comprises using a source of infra-red rays to heat the screen structure to a temperature of about 425° centigrade and applying the heat for a period of approximately two hours.

4. The method of removing burns from the screen structure of a used cathode ray tube, said screen structure consisting of a hard glass face plate and a luminescent material formed thereon, said material having a zinc compound as one of its components; which method comprises using a source of infra-red rays to heat the screen structure to a temperature of about 500° centigrade and applying the heat for a period of approximately one hour.

5. Apparatus for renewing the initial luminescent effectiveness of the screen in a used cathode ray tube, comprising a source of heat, and a housing cooperable with said source and said tube to confine substantially the heat from said source to application to the screen portion of said tube.

6. Apparatus for renewing the initial luminescent effectiveness of the phosphor screen in a used cathode ray tube which comprises a source of infra-red rays, a housing surrounding said source and being adapted to fit snugly the end of the cathode ray tube and furthermore being adapted to confine the infra-red rays from said source to application to said cathode ray tube at its end wall.

7. The apparatus of claim 6 wherein the housing is cylindrical and of polished metal, and provided with an external resilient dust-seal washer, whereby the apparatus is adapted to rejuvenate cathode ray tubes in place.

8. The method of reducing the proportion of free zinc in the luminescent screen of a cathode ray vacuum tube, the material of which screen includes a compound of zinc, which method comprises heating said screen for the period of time required to raise it to a temperature in a range such that the vapor pressure of the zinc substantially exceeds the normal internal pressure in the envelope of said vacuum tube and the vapor pressure of said compound does not substantially exceed said internal pressure.

9. The method of reducing the proportion of free metal in the luminescent screen of a cathode ray vacuum tube, the material of which screen includes a compound of said metal, which method comprises heating said screen for the period of time required to raise it to a temperature in a range such that the vapor pressure of said metal substantially exceeds the normal internal pressure in the envelope of said vacuum tube and the vapor pressure of said compound does not substantially exceed said internal pressure.

ARTHUR BRAMLEY.
CARL E. SWANSON.

No references cited.